(12) United States Patent
Brun (10) Patent No.: US 11,384,899 B2
(45) Date of Patent: Jul. 12, 2022

(54) FASTENING DEVICE

(71) Applicant: Emmanuel Brun, Igny (FR)

(72) Inventor: Emmanuel Brun, Igny (FR)

( * ) Notice: Subject to any disclaimer, the term of this patent is extended or adjusted under 35 U.S.C. 154(b) by 0 days.

(21) Appl. No.: 16/640,327

(22) PCT Filed: Aug. 20, 2018

(86) PCT No.: PCT/EP2018/072465
§ 371 (c)(1),
(2) Date: Feb. 19, 2020

(87) PCT Pub. No.: WO2019/038243
PCT Pub. Date: Feb. 28, 2019

(65) Prior Publication Data
US 2021/0080056 A1 Mar. 18, 2021

(30) Foreign Application Priority Data

Aug. 20, 2017 (EP) .................................... 17306082
Nov. 8, 2017 (FR) .................................... 1760497

(51) Int. Cl.
*A45F 5/10* (2006.01)
*F16M 13/04* (2006.01)
(Continued)

(52) U.S. Cl.
CPC .............. *F16M 13/04* (2013.01); *A45C 13/30* (2013.01); *A45F 2003/142* (2013.01);
(Continued)

(58) Field of Classification Search
CPC ........ A45F 2005/008; A45F 2200/0525; A45F 2200/0516; A45F 5/10; A45C 2013/303;
(Continued)

(56) References Cited

U.S. PATENT DOCUMENTS 4,202,139 A * 5/1980 Hong .................... B24D 15/045
15/227
5,887,723 A * 3/1999 Myles .................... G06F 1/1626
206/760
(Continued)

FOREIGN PATENT DOCUMENTS

EP 1736074 A1 12/2006

OTHER PUBLICATIONS

International Search Report dated Nov. 16, 2018, for International Patent Application No. PCT/EP2018/072465.
(Continued)

*Primary Examiner* — Adam J Waggenspack
(74) *Attorney, Agent, or Firm* — Karceski IP Law, PLLC (57) ABSTRACT

A fastening device includes a self-adhesive part having a self-adhesive surface and a connecting surface which is situated on the opposite side from the self-adhesive surface. A flexible strip extends from the connecting surface of the self-adhesive part. The flexible strip is joined to the self-adhesive part by means of a connecting element disposed in a region on the connecting surface. This region faces a central region of the self-adhesive surface. Thus, a traction force exerted on the flexible strip is distributed substantially uniformly over the self-adhesive surface.

11 Claims, 4 Drawing Sheets

(51) Int. Cl.
*A45C 13/30* (2006.01)
*A45F 3/14* (2006.01)
*A45F 5/00* (2006.01)
(52) U.S. Cl.
CPC . *A45F 2005/008* (2013.01); *A45F 2200/0516* (2013.01); *A45F 2200/0525* (2013.01)
(58) Field of Classification Search
CPC .............. A45C 13/30; A45C 2011/003; A45C 2011/002; H04B 2001/3861; H04B 1/385; H04B 1/3888
USPC .................................................. 224/217, 218
See application file for complete search history.

(56) References Cited

U.S. PATENT DOCUMENTS

| | | | |
|---|---|---|---|
| 8,480,144 B2 * | 7/2013 | Potter | A45F 5/10 294/25 |
| 8,561,862 B2 * | 10/2013 | Foggiato | A45F 5/00 224/217 |
| 8,950,638 B2 * | 2/2015 | Wangercyn, Jr. | A45F 5/00 224/217 |
| 9,392,863 B2 * | 7/2016 | Hamilton | A45F 5/021 |
| 9,943,125 B2 * | 4/2018 | LeMarbe | A41F 1/00 |
| 2009/0270050 A1 * | 10/2009 | Brown | H04B 1/3833 455/90.3 |
| 2011/0266316 A1 * | 11/2011 | Ghalib | A45F 5/00 224/217 |
| 2012/0103855 A1 | 5/2012 | Gaddis, II et al. | |
| 2012/0104059 A1 | 5/2012 | Yen | |
| 2014/0183888 A1 | 7/2014 | Wizikowski | |
| 2015/0305480 A1 * | 10/2015 | Brousseau | B25G 3/00 224/267 |

OTHER PUBLICATIONS

International Preliminary Report on Patentability dated Nov. 5, 2019, for International Patent Application No. PCT/EP2018/072465.
XP055626880 (Isa Rodriguez) Feb. 5, 2017, https://www.gadgetmatch.com/ungrip-review/.
English translation of the International Preliminary Report on Patentability dated Nov. 5, 2019, for International Patent Application No. PCT/EP2018/072465.

* cited by examiner

FASTENING DEVICE

CROSS-REFERENCE TO RELATED APPLICATION(S)

This is a National Stage Entry into the United States Patent and Trademark Office from International Patent Application No. PCT/EP2018/072465, having an international filing date of Aug. 20, 2018, which claims priority to French Patent Application No. FR1760497, filed on Nov. 8, 2017, and to European Patent Application No. EP17306082.3, filed on Aug. 20, 2017, the entire contents of all of which are incorporated herein by reference.

FIELD OF THE INVENTION

An aspect of the invention relates to a fastening device. This device can be used, for example, to fasten an object on a surface of another object. Other aspects of the invention relate to a gripping device and a case for an electronic apparatus.

DESCRIPTION OF RELATED ART

An electronic tablet can be used in many contexts of everyday life. For example, an electronic tablet can be used for strolling, in professional or commercial activities, for example in salons, in restaurants for a menu choice and/or for billing, and at home, for example for browsing the internet, whether standing, sitting at a table, sitting on a sofa, or in a lying position on the back.

However, gripping an electronic tablet can prove to be difficult, delicate for at least one of the following reasons. First, an electronic tablet, even if it is relatively light, has a considerable weight to support during a session of use. In addition, the session of use can be relatively long, which may accentuate a feeling of discomfort.

An electronic tablet can be difficult to hold; the electronic tablet can easily slide. It is possible to hold an electronic tablet at one of its sides. However, in this case, the weight of the electronic tablet creates a large moment which can generate muscle tension, especially in the long run. It is also possible to place the electronic tablet on the palm of an open hand. However, it is then difficult to keep the electronic tablet in balance, in particular when the other hand acts on the electronic tablet, for example, by pressing on the keys which are displayed on a touch screen.

In this regard it should also be noted that a user typically has a dominant hand and a weak hand. The user will generally use their dominant hand to act on a touch screen of an electronic tablet, so that it is the weak hand which must ensure the grip of the electronic tablet. Added to this is that the user can get tense by not wanting to drop the electronic tablet which represents a relatively expensive and fragile object, and which, in addition, generally contains a lot of personal and precious data.

The patent application published under the number US 2014/0183888 describes an approach for attaching a hand strap to a tablet in order to secure a tablet to a user's hand. This device serves as an aid to prevent the tablet from falling.

The company UNGRIP markets a solution for attaching a buckle to the back of a smart mobile phone, commonly called "smart phone" and designated by this term below. This bit bulky device allows sliding a finger in order to prevent any fall of the smart phone.

SUMMARY OF THE INVENTION

There is a need for a solution allowing an ergonomic fastening, in particular to facilitate the use of a portable electronic apparatus such as an electronic tablet.

According to one aspect of the invention, a fastening device comprises:

a self-adhesive having a self-adhesive surface and a connecting surface which is located opposite the self-adhesive surface, and a flexible strip, at least a portion of which extends from the connecting surface of the self-adhesive portion, the fastening device being characterized in that the flexible strip is linked to the self-adhesive by means of a connector disposed in an area on the connecting surface which is facing a central area of the self-adhesive surface so that a traction force exerted on the flexible strip is distributed substantially homogeneously over the self-adhesive surface.

According to another aspect of the invention, a gripping device comprises a fastening device as defined in the above, and another self-adhesive having a self-adhesive surface and a connecting surface which is located opposite to the self-adhesive surface, the flexible strip extending from one of the self-adhesive s to the other, the flexible strip being linked to the other self-adhesive by means of a connector disposed in an area on the connecting surface of the other self-adhesive portion which is facing a central area of the self-adhesive surface of the other self-adhesive portion so that a traction force exerted on the flexible strip is also distributed substantially homogeneously over the self-adhesive surface of the other self-adhesive portion.

According to yet another aspect of the invention, a gripping device comprises a fastening device as defined in the above and a buckle formed by the flexible strip capable of allowing the passage of at least one finger of a user.

According to yet another aspect of the invention, a case for an electronic apparatus is provided with a gripping device as defined in the above on a rear face of the case capable of at least partially covering a rear face of the electronic apparatus.

Compared to already existing devices, the invention has at least one of the following advantages: a device in accordance with the invention is relatively simple to produce, is easy to apply by a user, is robust in use, is comfortable, and is discreet. In some embodiments, the self-adhesive can be detachable and sometimes repositionable by pulling on an edge, an angle, of the self-adhesive which, however, resists detachment during use thanks to the way according to which the connector is disposed having the effect that a traction force is distributed homogeneously.

In one embodiment, the self-adhesive may comprise a stretch of the flexible strip, a portion of which is folded back.

In one embodiment, the connector can comprise a seam.

In one embodiment, an entire surface of the self-adhesive can constitute its self-adhesive surface, and the connector can be disposed centrally on the connecting surface.

In one embodiment, the self-adhesive may comprise an intermediate part disposed between the self-adhesive surface and the connecting surface.

In one embodiment, the self-adhesive may comprise a double-faced adhesive sheet one face of which is glued to a surface opposite to the connecting surface, and the other face of the double-faced adhesive sheet constituting the self-adhesive surface of the self-adhesive. The double-faced adhesive sheet may be a commercially available adhesive tape such as, for example, the 3M VHB™ adhesive tape marketed by the company 3M™, 3M VHB™ and 3M™ being trademarks of the American company Minnesota Mining and Manufacturing Company.

In one embodiment, the flexible strip may comprise a first section linked to the self-adhesive and having a free end provided with self-gripping elements, and may further comprise a second section linked to the other self-adhesive and having a free end provided with additional self-gripping elements capable of engaging with the self-gripping elements of the first section to form a removable link between the first section and the second section of the flexible strip.

In one embodiment, the flexible strip can be adjustable in length.

In one embodiment, the case may comprise a flap capable of at least partially covering a front face of the electronic apparatus, the flap can be removably fastened to the gripping device.

For illustration purposes, some embodiments of the invention are described in detail with reference to the appended drawings. This description will reveal additional features to those mentioned above, as well as the advantages that these additional features can bring.

DETAILED DESCRIPTION OF EMBODIMENTS OF THE INVENTION

Figure 1:
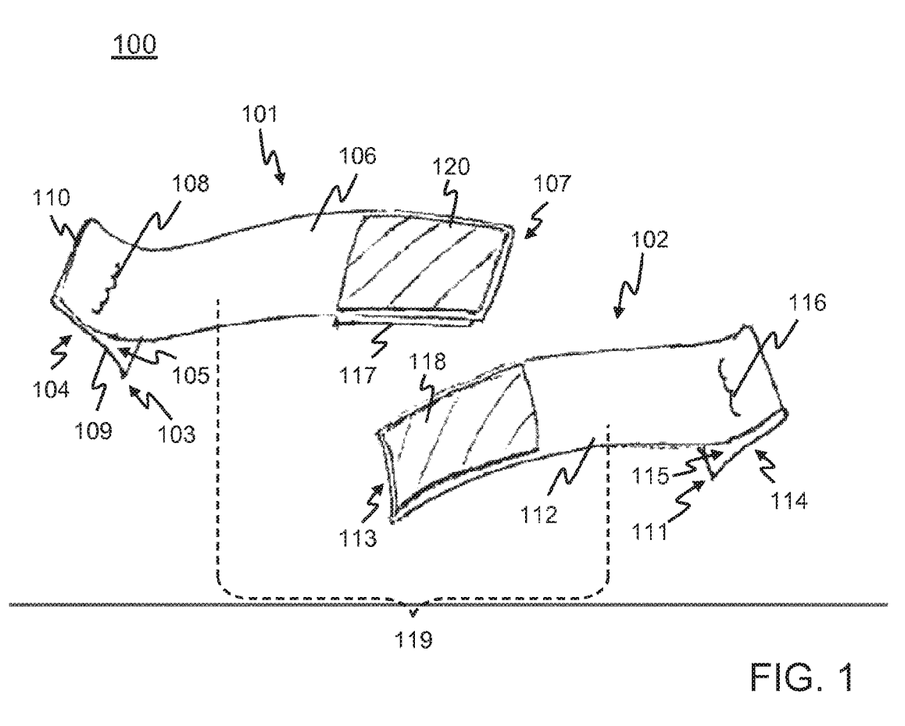
FIG. 1 is a schematic perspective view of a gripping device in a state decoupled into two portions.

FIG. 1 schematically illustrates a gripping device 100 in a state decoupled into two portions. FIG. 1 shows a schematic perspective view of the gripping device 100. The gripping device 100 can be used for an easy and ergonomic gripping of an object, in particular of a portable apparatus such as an electronic tablet. This use will be described in the following.

The gripping device 100 comprises two fastening devices 101, 102 which are decoupled from each other in FIG. 1. One of the two fastening devices 101, 102 will be designated left fastening device 101 in what follows for convenience reasons. The other fastening device will be designated right fastening device 102.

The left fastening device 101 comprises a self-adhesive 103. The self-adhesive portion 103 has a self-adhesive surface 104 and a connecting surface 105 which is located opposite the self-adhesive surface 104. A flexible strip 106 extends freely from the connecting surface 105 of the self-adhesive 103. Consequently, the flexible strip 106 has a free end 107.

The flexible strip 106 is linked to the self-adhesive 103 by means of a connector 108. The connector 108 is disposed in an area on the connecting surface 105 which is facing a central area of the self-adhesive surface 104. Thus, a traction force exerted on the flexible strip 106 is distributed substantially homogeneously over the self-adhesive surface 104.

In this embodiment, the self-adhesive 103 comprises a stretch of the flexible strip 106, a portion 109 of which is folded back. This stretch, which is located at one end of the flexible strip, therefore comprises a fold 110 which delimits the folded back portion 109.

In this embodiment, an entire surface of the self-adhesive 103 constitutes its self-adhesive surface 104. The connector 108 is then disposed centrally on the connecting surface 105. In this embodiment, the connector 108 comprises a seam. The seam extends between two points which are distant from each edge of the connecting surface 105.

The self-adhesive 103 may comprise an intermediate part disposed between the self-adhesive surface 104 and the connecting surface 105. The self-adhesive portion 103 may comprise a double-faced adhesive sheet. One face of this adhesive sheet can be glued to a surface opposite the connecting surface 105. In the embodiment illustrated in FIG. 1, this surface is present on the folded back portion 109 of the stretch of the flexible strip 106. The other face of the double-faced adhesive sheet can constitute the self-adhesive surface 104 of the self-adhesive.

The description of the left fastening device 101 above also applies to the right fastening device 102. Therefore, the right fastening device 102 also comprises a self-adhesive portion 111 and a flexible strip 112 extending freely from this self-adhesive portion 111 and, consequently, having a free end 113. The self-adhesive 111 of the right fastening device 102 is similar to the self-adhesive 103 of the left fastening device 101. Consequently, the self-adhesive 111 of the right fastening device 102 has a self-adhesive surface 114 and a connecting surface 115 which is located opposite the self-adhesive surface 114.

The flexible strip 112 of the right fastening device 102 is linked to the self-adhesive portion 111 by means of a connector 116. This connector 116 is also disposed in an area on the connecting surface 115 of the self-adhesive 111 which is facing to a central area of the self-adhesive surface 114. Thus, a traction force exerted on the flexible strip 112 is also distributed substantially homogeneously over the self-adhesive surface 114 of the self-adhesive 111 of the right fastening device 102.

The free end 107 of the flexible strip 106 of the left fastening device 101 is provided with self-gripping elements 117. These self-gripping elements 117 are present on a rear face of this flexible strip 106. The free end 113 of the flexible strip 112 of the right fastening device 102 is provided with additional self-gripping elements 118. These additional self-gripping elements 118 are present on a front face of this flexible strip 112. The additional self-gripping elements 118 on the flexible strip 112 of the right fastening device 102 can engage with the self-gripping elements 117 on the flexible strip 106 of the left fastening device 101. Thus, a removable link can be formed between the flexible strip 106 of the left fastening 101 and the flexible strip 112 of the right fastening device 102.

The flexible strip 106 of the left fastening device 101 and the flexible strip 112 of the right fastening device 102 indeed form a single flexible composite strip 119 of the gripping device 100. The flexible strip 106 of the left fastening device 101 constitutes a first section of this flexible composite strip 119. The flexible strip 112 of the right fastening device 102 constitutes a second section of the flexible composite strip 119. The flexible strip 106 of the left fastening device 101 and the flexible strip 112 of the right fastening device 102 will be respectively designated the left section 106 and the right section 112 of the flexible composite strip 119 for convenience reasons.

The self-adhesive 103 of the left fastening device 101 constitutes a self-adhesive of the gripping device 100 which will be designated the left self-adhesive portion 103 of the gripping device 100 in the following for convenience reasons. The self-adhesive 111 of the right fastening device 102 constitutes another self-adhesive of the gripping device 100 which will be designated the right self-adhesive 111 of the gripping device 100.

The flexible composite strip 119 is linked, on the one hand, to the left self-adhesive portion 103 of the gripping device 100 and, on the other hand, to the right self-adhesive portion 111. The flexible composite strip 119 extends from the left self-adhesive portion 103 to the right self-adhesive 111 of the gripping device 100. The flexible composite strip 119 is adjustable in length. Other solutions exist for linking the left section 106 to the right section 112 so that the flexible composite strip 119 is adjustable in length. For example, a link allowing to tighten a strap can be used for this end.

The flexible composite strip 119 comprises self-gripping elements exposed outside 120 to form a link with an external element. In this embodiment, the self-gripping elements exposed to the outside 120 are located on the front face of the left section 106 of flexible composite strip 119. More specifically, the self-gripping elements exposed to the outside 120 are located back-to-back with the self-gripping elements 117 which allow the removable link between the left section 106 and the right section 112 of flexible composite strip 119.

Figure 2:
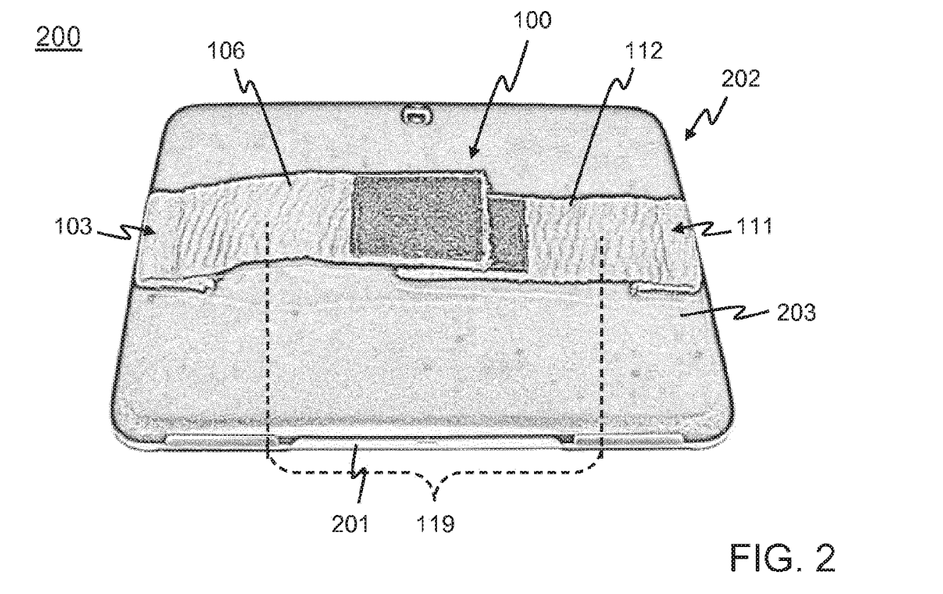
FIG. 2 is a schematic rear perspective view of an assembly comprising an electronic tablet in a case to which the gripping device is applied.
Figure 3:
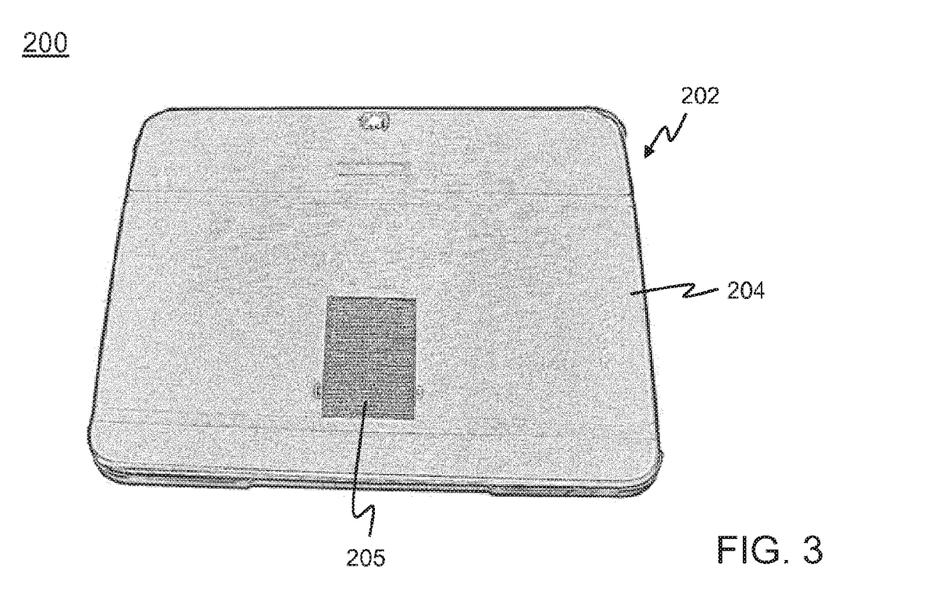
FIG. 3 is a schematic front view of the assembly comprising the electronic tablet in the case to which the gripping device is applied.

FIGS. 2 and 3 schematically illustrate an assembly 200 comprising an electronic tablet 201 in a case 202 to which the gripping device 100 is applied. FIG. 2 shows a schematic rear perspective view of this assembly 200. FIG. 3 shows a schematic front perspective view of the assembly 200. In FIGS. 2 and 3, the case 202 is in a closed state.

Referring to FIG. 2, the gripping device 100 is glued on a rear face 203 of the case 202 which covers a rear face of the electronic tablet 201. More specifically, the left self-adhesive 103 and the right self-adhesive 111 of the gripping device 100 illustrated in FIG. 1 are glued to the rear face 203 of the case 202. The gripping device 100 is in a state of unity: the left section 106 and the right section 112 of the flexible composite strip 119 are removably linked to each other. This removable link is established by means of the self-gripping elements 117 and of the additional self-gripping elements 118, as already indicated in the foregoing with reference to FIG. 1. The gripping device 100 is glued so that the flexible composite strip 119 is loose. For this purpose, the left self-adhesive 103 and the right self-adhesive 111 were glued to the rear face 203 of the case 202 with a sufficiently small spacing. The spacing between these self-adhesive s may be less than a nominal length of the flexible composite strip extending between the self-adhesive s. The nominal length of the flexible composite strip 119 can be characterized by a maximum overlap between the self-gripping elements 117 and the additional self-gripping elements 118, illustrated in FIG. 1, which form the removable link.

Referring to FIG. 3, a flap 204 of the case 202 at least partially covers a front face of the electronic tablet 201 when the case 202 is in the closed state. The flap 204 comprises a sheet 205 provided with self-gripping elements. This sheet 205 can be, for example, glued on the flap 204 of the case 202. The self-gripping elements of the sheet 205 can engage with the self-gripping elements exposed to the outside 120 on the flexible composite strip 119 illustrated in FIG. 1. Thus, the flap 204 can be removably fastened to the gripping device 100, which will be described in more detail in the following.

Figure 4:
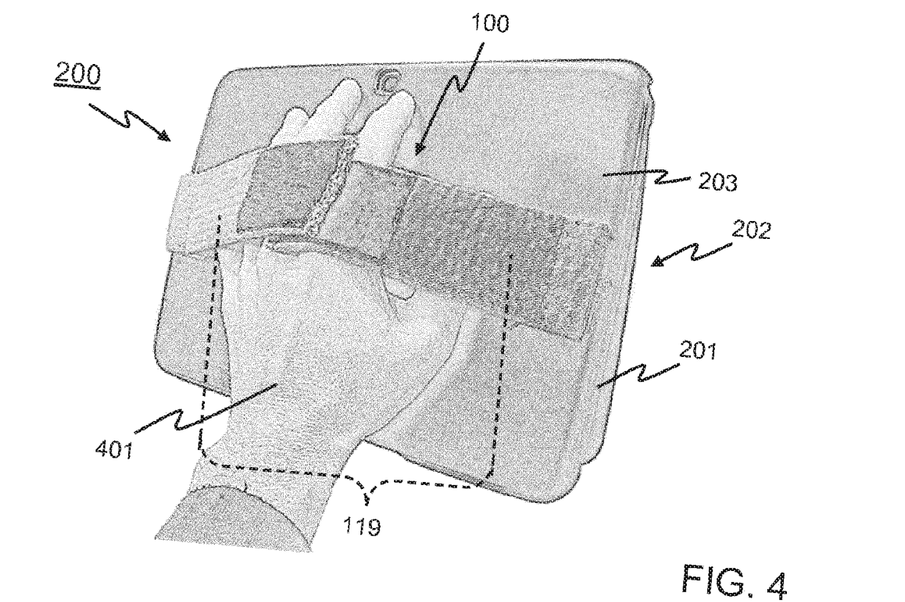
FIG. 4 is a schematic rear perspective view of an initial gripping of the assembly comprising the electronic tablet in the case to which the gripping device is applied.

FIG. 4 schematically illustrates an initial grip of the assembly 200 comprising the electronic tablet 201 in the case 202 to which the gripping device 100 is applied. FIG. 4 shows a schematic rear perspective view of the initial grip of the assembly 200.

During the initial grip, a user slides a hand 401 between the rear face 203 of the case 202 containing the electronic tablet 201 and the flexible composite strip 119 of the gripping device 100. The flexible composite strip 119 has been adjusted in length such that the hand 401 is slightly tightened between the flexible composite strip 119 and the rear face 203 of the case 202. This can apply to a condition where the hand 401 is slightly curved as illustrated in FIG. 4. After the initial gripping, the user can, with their hand 401, easily translate, pivot and thus orient the electronic tablet 201 which is in the case 202. The other hand 401 of the user is free.

Figure 5:
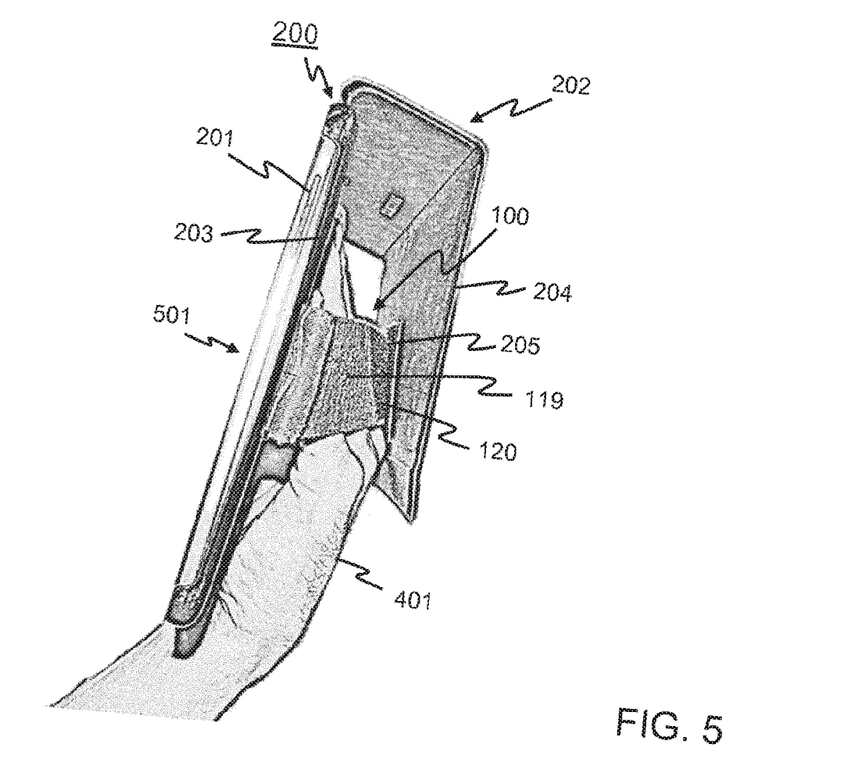
FIG. 5 is a schematic side perspective view of a complete grip of the assembly comprising the electronic tablet in the case to which the gripping device is applied.

FIG. 5 schematically illustrates a complete gripping of the assembly 200 comprising the electronic tablet 201 in the case 202 to which the gripping device 100 is applied, FIG. 5 shows a schematic side perspective view of the final grip of the assembly 200 similar to the initial grip illustrated in FIG. 4, the hand of the user 401 is placed between the rear face 203 of the case 202 containing the electronic tablet 201 and the flexible composite strip 119 of the gripping device 100.

When fully gripped, the case 202 is in the open state: the flap 204 is folded rearward. The front face of the electronic tablet 201 is then uncovered such that the user can use a user interface which is located on the front face of the electronic tablet 201. The front face is referenced 501 in FIG. 5. In this embodiment, the user interface is in the form of a touch screen. With their other hand, which is free, the user can actuate keys, as well as other objects, displayed on the touch screen.

The flap 204 is removably fastened to the gripping device 100 which contributes to the user comfort. In this embodiment, this removable link is made by means of the following elements: on the one hand, the self-gripping elements exposed to the outside 120 which are located on the flexible composite strip of the gripping device 100 illustrated in FIGS. 1 and 2 and, on the other hand, the sheet 205 provided with self-gripping elements on the flap 204 of the case 202 illustrated in FIG. 3.

Figure 6:
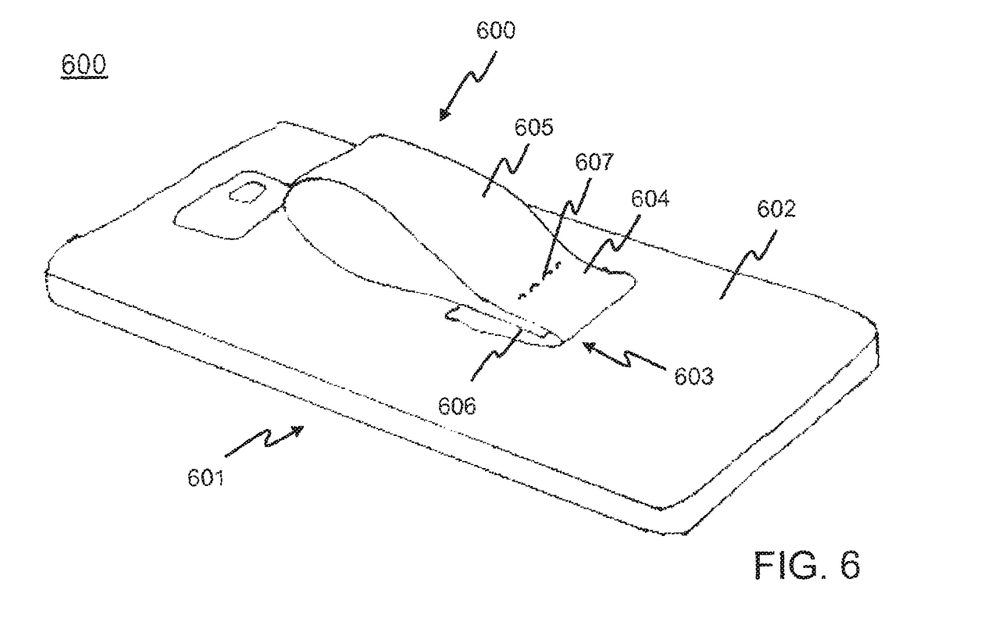
FIG. 6 is a schematic perspective view of an alternative gripping device applied to a smart phone.

FIG. 6 schematically illustrates an alternative gripping device 600 applied to a smart phone 601. FIG. 6 shows a schematic perspective view of the alternative gripping device 600 applied to the smart phone 601. In this embodiment, the alternative gripping device 600 is fastened on a rear face 602 of the smart phone 601.

The gripping device 600 comprises a self-adhesive 603 having a self-adhesive surface which is engaged with the rear face 602 of the smart phone 601. The self-adhesive surface is not visible in FIG. 6. The self-adhesive also comprises a connecting surface 604, visible in FIG. 6, which is located opposite the self-adhesive surface. A flexible strip 605 extends from the connecting surface 604 of the self-adhesive 603.

In the alternative gripping device 600, the flexible strip 605 is disposed in a buckle. This buckle allows the passage of at least one finger of a user.

More specifically, a stretch of the flexible strip 605, which is located at one end thereof, belongs to the self-adhesive 603 of the alternative gripping device 600. This stretch is folded into a "U" shape such that the stretch has a lower segment and an upper segment. Another end 606 of the flexible strip 605, which is located opposite the "U" shape folded stretch, is sandwiched between the lower segment and the upper segment of the stretch. A connector 607 permanently fastens the end 606 of the flexible strip 605 to the "U" shaped stretch wherein it is sandwiched. In this embodiment, the connector 607 comprises a seam.

In this embodiment, the connector 607 is also disposed in an area on the connecting surface 604 of the self-adhesive 603 which is facing a central area of the self-adhesive surface. Thus, a traction force exerted on the flexible strip 605, and more generally on the alternative gripping device 600, is also distributed substantially homogeneously over the self-adhesive surface of the self-adhesive 603 of the alternative gripping device 600.

Figure 7:
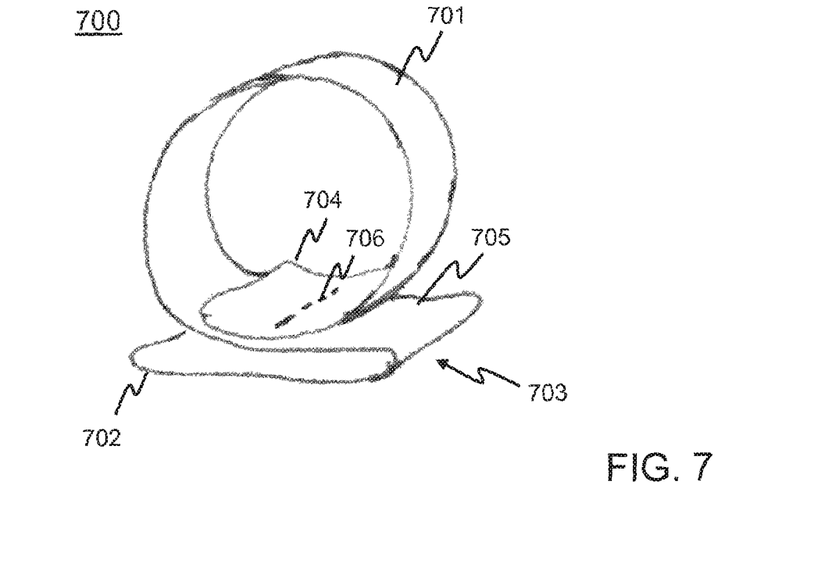
FIG. 7 is a schematic perspective view of another alternative gripping device.

FIG. 7 schematically illustrates another alternative gripping device 700. FIG. 7 shows a schematic perspective view of the other alternative gripping device 700. The other alternative gripping device 700 comprises many points in common with the alternative gripping device 600 illustrated in FIG. 6. A stretch of a flexible strip 701, which is located at one end 702 thereof, belongs to a self-adhesive 703 of the other alternative gripping device 700. This stretch is folded into a "U" shape. Another end 704 of the flexible strip 701 is disposed on an upper face 705 of the "U" shape folded stretch. A connector 706 permanently fastens this other end 704 of the flexible strip 701 to the "U" shape folded stretch.

The embodiments described in the foregoing with reference to the drawings are presented by way of illustration. The invention can be implemented in many different ways. To illustrate this, some alternatives are briefly indicated.

The invention can be implemented in many types of products and methods involving the fastening of an object and, more specifically, the fastening of a gripping device. A fastening device in accordance with the invention can be applied to any type of object having an outer surface, at least a portion of which can accommodate the self-adhesive surface of the fastening device. In the embodiments presented, a fastening device in accordance with the invention is applied to a case containing an electronic tablet. In another embodiment, a fastening device in accordance with the invention can be applied to a window, for example, a window of a vehicle.

Similarly, a gripping device in accordance with the invention can be applied to any type of object having an outer surface at least one portion of which can accommodate one and the other self-adhesive surface of the gripping device. In the embodiments presented, a gripping device in accordance with the invention is applied to a case containing an electronic tablet. In another embodiment, a gripping device in accordance with the invention can be directly applied to an electronic tablet, or to another type of portable electronic apparatus such as, for example, a mobile telephone. In such an embodiment, the gripping device can be glued on a rear face of the portable electronic apparatus, a front face of which comprises a user interface. Thus, a user can conveniently hold the portable electronic apparatus, in a secure manner, with one of their two hands, their other hand being free to act on the user interface, also ergonomically.

There are many ways to implement a gripping device in accordance with the invention. In some embodiments presented, a gripping device is formed by a pair of fastening devices in accordance with the invention, the flexible strips of which can be removably linked to each other. In other embodiments, a gripping device in accordance with the invention may comprise a single inseparable flexible strip which extends between two self-adhesive s. In some embodiments presented, a gripping device is formed by a single fastening device in accordance with the invention, the flexible strip of which is disposed in a buckle, one end of the flexible strip belonging to the self-adhesive portion, another end being permanently fastened to the self-adhesive. In other embodiments, a gripping device in accordance with the invention may comprise a buckle by fastening one end of the flexible strip to a stretch of the flexible strip which extends from the self-adhesive.

There are many ways to implement a self-adhesive in a fastening device in accordance with the invention and therefore in a gripping device in accordance with the invention. In the embodiments presented, the self-adhesive comprises a stretch of the flexible strip, a portion of which is folded back. In another embodiment, the self-adhesive may comprise a part separate from the flexible strip. Such an embodiment can be obtained, for example, from the embodiment illustrated in FIG. 1 by cutting the extension of the flexible strip where the fold 110 is located. In yet another embodiment, the self-adhesive may comprise, for example, a plate, or a sheet, a main face of which is at least partially self-adhesive. This plate, or sheet, can comprise several layers.

There are many ways to implement a connector linking the flexible strip to the self-adhesive in a fastening device in accordance with the invention and therefore in a gripping device in accordance with the invention. In the embodiments presented, the connector comprises a seam. In other embodiments, the connector may comprise, for example, a staple, a rivet, a weld, a glue, or any other suitable means of connecting means.

There are many ways to implement a removable link in a fastening device in accordance with the invention and therefore in a gripping device in accordance with the invention. In the embodiments presented, the removable links are made by means of self-gripping elements. In other embodiments, a removable link can be made, for example, by means of one or more snap-fitting element(s).

The foregoing remarks show that the embodiments described with reference to the drawings illustrate the invention rather than limit it. The reference signs are not restrictive. The verb "to comprise" in a claim does not exclude the presence of other elements or other steps other than those listed in the claim. The same goes for similar verbs such as "to include" and "to involve". The mention of an element in the singular in a claim whose object is a product does not exclude that the product may comprise a plurality of such elements. Similarly, the mention of a step in the singular in a claim whose object is a method does not exclude that the method may comprise a plurality of such steps.

The invention claimed is:

1. A fastening device for application on a portable electronic apparatus, the fastening device comprising:
   a self-adhesive base having a self-adhesive surface and a connecting surface which surfaces are opposite to each other,
   a flexible strip having a first stretch that extends from the connecting surface of the self-adhesive base, wherein the first stretch of the flexible strip is linked to the self-adhesive base by means of a connector disposed in an area on the connecting surface that is opposite to a central area of the self-adhesive surface so that a traction force exerted on the first stretch of the flexible strip is distributed over the self-adhesive surface to provide resistance against detachment of the self-adhesive base, and wherein a second stretch of the flexible strip at least partially forms the self-adhesive base, the second stretch being located at an end of the flexible strip and comprising a folded-back portion delimited by a fold adapted to be cut.

2. The fastening device according to claim 1, wherein the connector comprises a seam.

3. The fastening device according to claim 1, wherein an entire surface of the self-adhesive base constitutes its self-adhesive surface, the connector being disposed centrally on the connecting surface.

4. The fastening device according to claim 1, wherein the first stretch of the flexible strip forms a buckle adapted to fit at least one finger of a user.

5. The fastening device according to claim 1, wherein the self-adhesive base comprises a double-faced adhesive sheet, one face of which is glued to a surface opposite to the connecting surface, the other face of the double-faced adhesive sheet constituting the self-adhesive surface of the self-adhesive base.

6. A gripping device for application on a portable electronic apparatus, the gripping device comprising:
   a first self-adhesive base having a first self-adhesive surface and a first connecting surface which surfaces are opposite to each other,
   a second self-adhesive base having a second self-adhesive surface and a second connecting surface which surfaces are opposite to each other,
   a flexible strip having a first stretch that extends from the first self-adhesive base to the second self-adhesive base,
   wherein the first stretch of the flexible strip is linked to the first self-adhesive base by means of a first connector disposed in an area on the first connecting surface that is opposite to a central area of the first self-adhesive surface so that a traction force exerted on the first stretch of the flexible strip is distributed over the first self-adhesive surface to provide resistance against detachment of the first self-adhesive base, wherein the first stretch of the flexible strip is further linked to the second self-adhesive base by means of a second connector disposed in an area on the second connecting surface that is opposite to a central area of the second self-adhesive surface so that a traction force exerted on the first stretch of the flexible strip is distributed over the second self-adhesive surface to provide resistance against detachment of second first self-adhesive base, wherein a second stretch of the flexible strip at least partially forms the first self-adhesive base, the second stretch being located at a first end of the flexible strip and comprising a folded-back portion delimited by a fold adapted to be cut, and wherein a third stretch of the flexible strip at least partially forms the second self-adhesive base, the third stretch being located at a second end of the flexible strip and comprising a folded-back portion delimited by a fold adapted to be cut.

7. The gripping device according to claim 6, wherein the first stretch of the flexible strip comprises:
   a first section linked to the first self-adhesive base and having a free end provided with self-gripping elements, and
   a second section linked to the second self-adhesive base and having a free end provided with additional self-gripping elements capable of engaging with the self-gripping elements of the first section to form a removable link between the first section and the second section of the first stretch of the flexible strip.

8. The gripping device according to claim 6, wherein the flexible strip is adjustable in length.

9. The gripping device according to claim 6, wherein the first stretch of the flexible strip forms a buckle adapted to fit at least one finger.

10. A case for a portable electronic apparatus, the case having rear face adapted to at least partially cover a rear face of the portable electronic apparatus, the rear face of the case being provided with a gripping device according to claim 6.

11. The case according to claim 10, the case comprising a flap capable of at least partially covering a front face of the portable electronic apparatus, the flap being removably attached to the gripping device.

\* \* \* \* \*